United States Patent Office 3,479,320
Patented Nov. 18, 1969

3,479,320
POLYMERIZATION OF CYCLIC ORGANOSILOXANES WITH GROUP II–A METAL COMPLEXES
Edgar E. Bostick, Scotia, N.Y., assignor to General Electric Company, a corporation of New York
No Drawing. Filed June 24, 1968, Ser. No. 739,162
Int. Cl. C08g 31/34; C08f 7/18
U.S. Cl. 260—46.5                    11 Claims

ABSTRACT OF THE DISCLOSURE

Cyclic organosiloxanes are polymerized with a Group II–A metal compound complex to give essentially linear polydiorganosiloxane homopolymeric and copolymeric fluids, gums, and thermoplastic resins. The fluid organopolysiloxanes which are prepared in accordance with the process of this invention are useful as lubricants, damping fluids, etc. The rubbery and thermoplastic polymers produced in accordance with this process are useful as gasketing materials, coatings, for producing molded articles, hoses, wire insulation, and dielectric materials, etc.

Polymerization of cyclic organosiloxanes with Group II–A metal complexes

This invention is concerned with a process for the Group II–A metal complex as the catalyst for siloxane rearrangement.

In accordance with the process of this invention, at least one cyclic organosiloxane having the formula, (I)
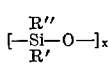

where R′ and R″ are selected from the class consisting of hydrogen, monovalent hydrocarbon radicals, halogenated monovalent hydrocarbon radicals and cyanoalkyl radicals and $x$ is an integer of from 3 to 7, is admixed with an organometallic compound having the formula, (II)

or (III)

wherein M is a Group II–A metal and R is a polynuclear hydrocarbon or divalent hydrocarbon radical, said organometallic compound being complexed with an aprotic dipolar solvent and the admixture maintained at a temperature at which the cyclic organosiloxane reacts with and is polymerized by the organometallic compound to yield linear diorganosiloxane polymers and copolymers.

The temperature at which the process of this invention is conducted is not narrowly critical and can range from as low as 20° C. to as high as 250° C. or higher. It is preferred to employ temperatures in the range of from 25° C. to 225° C. in the process of this invention.

The amount of the Group II–A metal compound employed as an initiator or catalyst in this invention is not narrowly critical and can be from as low as one mole of the compound for each mole of the cyclic organosiloxane to as little as one mole of the Group II–A metal compound for every 10,000 to 20,000 moles of cyclic organosiloxane.

The process of this invetnion can be practiced as a heterogeneous reaction system or as a homogeneous reaction system. In the former instance, the group II–A metal compound catalyst is dispersed in the organosiloxane by stirring, etc., and the mixture heated to cause the reaction of the Group II–A metal compound with the cyclic organosilozane and concomitant polymerization to yield the linear polydiorganosiloxanes. In the latter instance, in order to have a homogeneous system, a solvent must be employed. The solvents which are employable in the process of this invention are those in which the Group II–A metal compound and the cyclic organosiloxane and the diorgano polysiloxanes produced are soluble. These solvents are the aprotic solvents and include benzene, toluene, xylene, tetrahydrofuran, hexamethylphosphoramide (HMP), octamethylpyrophosphoramide, ethylene glycol dimethyl ether, diethylene glycol dimethyl ether, N,N,N′,N′-tetramethyl urea, N,N,N′,N′-tetramethyl ethylenediamine, etc. The aprotic solvents employed in the polymerization process of this invention must be of extremely high purity; i.e., containing less than 0.1 part per million of impurities.

The process of this invention is preferably carried out under autogenous pressure or under an inert atmosphere such as nitrogen, argon, krypton, methane, propane, and other gases which do not react with either the cycloorganosiloxane or the Group II–A metal compound.

In order to produce copolymeric linear diorganopolysiloxanes in accordance with the process of this invention, one can form an admixture of one or more cyclic organosiloxanes within the definition of the cyclic organosiloxane shown in Formula I above with the Group II–A metal compound and perform the process in accordance with the above-given procedure or one can form an admixture of a single cyclic organosiloxane of Formula I with the Group II–A metal compound and cause a reaction and polymerization and then subsequently add one or more different cyclic organosiloxanes within the scope of Formula I to form block copolymers or random copolymers.

Illustrative of the monovalent hydrocarbon radicals which R′ and R″ represent are, for example, alkyl radicals, including cycloalkyl, such as methyl, ethyl, isopropyl, tertiarybutyl, octadecyl, decyl, cyclohexyl, cyclopentyl, etc.; alkenyl radicals, including cycloalkenyl radicals, such as vinyl, allyl, methallyl, decenyl, butadienyl, cyclopentenyl, cyclohexenyl, etc.; aryl radicals, such as phenyl, biphenyl, naphthyl, etc.; aralkyl radicals, such as benzyl, beta-phenylethyl, beta-phenylpropyl, etc.; alkaryl radicals, such as tolyl, xylyl, etc. The halogenated monovalent hydrocarbon radicals which R′ and R″ represent are, for example, chlorinated alkyls and aryls as given above, such as, chloromethyl, gamma-chloropropyl, bromocyclohexyl, perfluorovinyl, chlorocyclohexyl, trifluoropropyl, pentafluorobutyl, dibromophenyl, pentachlorophenyl, alpha, alpha, alpha-trifluoromethylphenyl, etc. The cyanoalkyl radicals represented by R′ and R″ are, for example, cyanoethyl, cyanopropyl, cyanobutyl, cyanophenyl, cyanomethyl, alpha-cyanomethyl, etc.

The cyclic siloxanes represented by Formula I which can be employed in the process of this invention include the cyclosiloxanes such as hexamethylcyclotrisiloxane, octamethylcyclotetrasiloxane, decamethylcyclopentasiloxane, dodecamethylcyclohexasiloxane, hexaethylcyclotrisiloxane, trimethyltriethylcyclotrisiloxane, tetramethyltetraethylcyclotetrasiloxane, tetramethyltetravinylcyclotetrasiloxane, trimethyltrivinylcyclotrisiloxane, triphenyltrivinylcyclotrisiloxane, heptamethylallylcyclotetrasiloxane, hexaphenylcyclotrisiloxane, octaphenylcyclotetrasiloxane, cis- and trans-trimethyltriphenylcyclotrisiloxane, pentamethylcyclotrisiloxane, hexamethylcyclotetrasiloxane, and the like. These cyclic siloxanes can contain minor amounts of monofunctional and/or trifunctional organosiloxanes which impurities will not affect the final polymer providing they are present in amounts so that the hydrocarbon group to silicon atom ratio in the final polymer is approximately 2.0 as hereinafter described.

The linear diorganopolysiloxanes produced in accordance with the process of this invention can have molecular weights in the range from about 100,000 to 3,000,000 or even higher, and include both homopolymeric and copolymeric gums, fluids and thermoplastic resins. The organopolysiloxane gums produced preferably contain hydrocarbon pendant groups per silicon atom in a ratio of about 2.0 hydrocarbon groups per silicon atom and attached to silicon by C-Si bonds. Deviations from the ratio of 2 in any instance as, for example, ratios from about 1.95 to about 2.05, with respect to the preferred practice of this invention will be insignificant for all practical purposes since it will be attributable to the presence of endblocking hydrocarbon groups whose total numbers will be insignificant as compared with the total numbers of hydrocarbon groups attached to the silicon atoms of linear polysiloxane chains.

The Group II-A metal compound employed as initiators or catalysts in the process of this invention are prepared by adding a Group II-A metal to a solution of a polynuclear hydrocarbon or conjugated hydrocarbon in an aprotic dipolar solvent such as hexamethylphosphoramide at a temperature of from as low as 15° C. to as high as 100° C. or higher with stirring under an inert atmosphere such as nitrogen, argon, etc., and under anhydrous conditions. It is believed that the reaction takes place in accordance with the following equations to yield the metal complex.

$$M° + 2R \rightleftarrows M^{++}[R]_2^{--}$$
$$[A] + M° \rightleftarrows 2M^{++}[R]^{--} \quad [A]$$

wherein M is a Group II-A metal and R is a polynuclear hydrocarbon or a conjungated hydrocarbon as hereinafter defined.

The form in which the metal is added to the reaction mixture is not critical. The metal can be added as a finely divided powder, turnings, wire, or as an amalgam, or from a deposit of a suitable clean metal mirror substrate.

The temperature at which the reaction of the Group II-A metal with the polynuclear or conjugated hydrocarbon is conducted can range from as low as 5° C. to as high as 120° C. It is preferred for ease of reaction and convenience to employ temperatures in the range of 15° C. to 100° C.

The metals represented by M include the Group II-A metals, commonly called the alkaline earth metals; i.e., beryllium, magnesium, calcium, strontium and barium.

The Group II-A metal compounds employed as initiators or catalysts in the process of this invention are produced by reacting the Group II-A metals and polynuclear hydrocarbon or conjugated olefinic hydrocarbons in equivalent amounts; i.e., at least 1 mole of the hydrocarbon for each mole of the Group II-A metal. It is particularly preferred, for completeness of reaction and ease of handling of the complex, to employ an excess of the hydrocarbon and in the presence of an aprotic dipolar solvent.

The aprotic dipolar solvents which must be employed in the preparation of the Group II-A metal compound-complexes employed in this invention are selected aprotic dipolar solvents such as, for example, hexamethylphosphoramide (HMP), octamethylpyrophosphoramide, tetrahydrofuran, ethyleneglycol dimethyl ether, diethyleneglycol, dimethyl ether, N,N,N',N' - tetramethylethylenediamine, N,N,N',N'-tetramethyl urea, and mixtures thereof. These solvents must be of extremely high purity; i.e., contain less than 0.1 part per million of impurities.

In addition to the above-selected aprotic dipolar solvents, one of which must be employed in producing the Group II-A metal complexes employed in the process of this invention, one can also employ other non-reactive aprotic hydrocarbon solvents such as benzene, toluene, xylene, etc.

The Group II-A metal complex catalyst employed in the process of this invention can be isolated from the solutions in which they are prepared by precipitation, drying, recrystallization, and other techniques to yield solid Group II-A metal complexes which can then be employed as an initiating or polymerization catalyst as set forth in the polymerization process of this invention. These Group II-A metal compounds are stabilized by virtue of their coordination with the particular aprotic dipolar solvents which are employed in their production.

By the term "polynuclear hydrocarbons" as employed herein is meant those hydrocarbons containing 2 or more aromatic or heterocyclic pseudoaromatic rings in direct conjugation or fusion and having available low energy orbitals capable of electron acceptance, for example, biphenyl, naphthalene, anthracene, acenaphthalene, rubrene, phenanthracene, benzonaphthalene, fluorene, metaterphenyl, paraterphenyl, quaterphenyl, perylene, pyrene, pycene, chrysene, 3,4-benzpyrene, tetracene, hexacene and heptacene, etc.

By the term "conjugated hydrocarbons" as employed herein is meant, stilbene, 1,1-diphenylethylene, cyclooctatetraene, cyclooctadiene, cyclooctatriene, styrene, α-methylstyrene, β-methylstyrene, isoprene, butadiene, etc., that is, hydrocarbons containing double bonded carbons that conjugate with other double bonded carbon atoms either aliphatic or aromatic in character. These conjugated hydrocarbons other than the cyclooctapolyenes are more readily pictured as having the general formula—

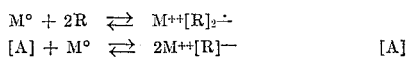

where R''' is an alkyl (i.e., methyl, ethyl, propyl, butyl, dodecyl, octadecyl, etc.) or aryl group, (i.e., phenyl, biphenyl, naphthyl, tolyl, xylyl, etc.) or a

group and R'''' is hydrogen, alkyl or aryl, and where the unsatisfied values are satisfied by a member selected from the class consisting of hydrogen and monovalent hydrocarbon radicals.

Illustrative of the Group II-A metal complexes which are produced in accordance with this invention are, for example,

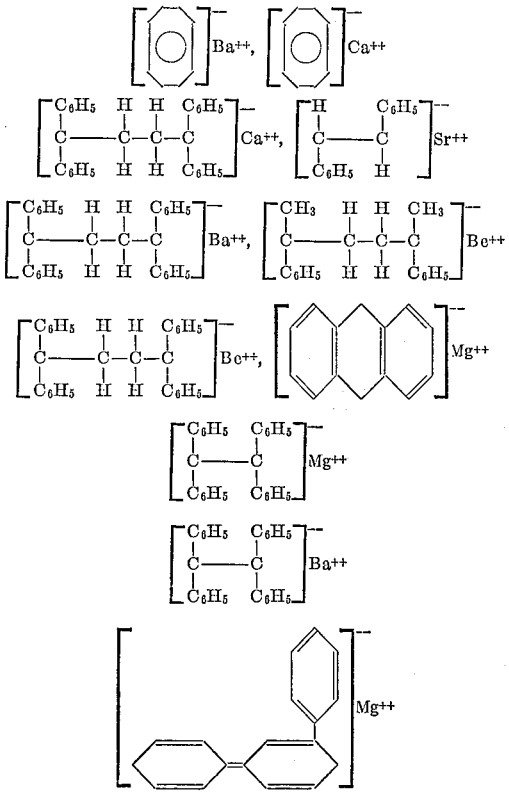

As in the preparation of the Group II-A metal compound-complex, the polymerization process of this invention must be conducted under anhydrous conditions and in an inert atmosphere free of oxygen, oxides of carbon and any acidic compounds. Although a solvent is not necessary in conducting the polymerization process of this invention, a solvent can be employed if desired for ease of recovery of reaction products, ease of controlling the reaction and to given a more homogeneous or uniform polymerization product. This is especially true where multiple sequence additions of the same or a cyclic organosiloxane occur at different stages of the reaction process, thereby giving block sequences in the polymer product., The solvents which can be employed in the polymerization process of this invention are the solvents given above. The amount of solvent employed in the process of this invention is not narrowly critical and can range, by weight, from 10 parts to 1000 or more parts solvent for each 100 parts of the cyclic organosiloxane employed in the polymerization process of this invention.

The polymerization process of this invention can be conducted at sub-atmospheric, atmospheric or super-atmospheric pressures. It is preferred to conduct the process at atmospheric pressure for convenience and ease of construction of the apparatus.

The linear organopolysiloxane gums produced by the process of this invention can be compounded with fillers such as carbon black, silica, fumed silica, clay, diatomaceous earth, etc., and a curing catalyst such as diorganoperoxides, hyperperoxides, peracids, sulfonazides, e.g., dibenzoyl peroxide, bis-2,4 dichlorobenxoyl peroxide, dicumyl peroxide, $\alpha,\alpha$-azo-bis-isobutyronitrile and other free radical catalysts, and heat cured to yield organopolysiloxane elastomeric compositions.

The organopolysiloxane elastomeric compositions produced in accordance with the instant invention find wide use as cable and wire insulations as well as vibration damping mounts, gaskets, seals, coatings and like applications requiring resistance to low and high temperatures.

The organopolysiloxanes produced in accordance with the process of this invention can also be reacted with halotriacetoxysilyl compounds, such as chlorotriacetoxysilane to yield compositions having terminal triacetoxysilyl groups which when componded with filters and/or additives are room temperature cured and can be employed as caulking compounds, sealants, etc.

Catalyst preparation (A) One gram of finely divided, finely ground barium was added to 20 ml. of dry HMP in a 100 ml. 3-neck round bottom flask, fitted with a glass covered stirring bar, water-cooled condenser with a nitrogen bypass, stopper and a 3 inch tub fitted with a serum stopper. Stirring was started and 1,1-diphenylethylene (1.5 ml.) was added through the serum stopper. The solution slowly became a dark blue-green, then changed to a deep-red color. The precipitate which formed was allowed to settle after four hours of stirring. The stirred suspension of the precipitate in HMP was employed as a catalyst, hereinafter referred to as Catalyst A.

(B) Finely ground barium (0.7 gram) was added under a nitrogen atmosphere to 14 ml. of HMP in a 100 ml. 3-necked round-bottom flask fitted with a glass-covered magnetic stirring bar, water-cooled condenser, nitrogen bypass and 3 inch tube with a serum closure. The suspension was stirred at room temperature for 24 hours; then, cyclooctatetraene (0.53 ml.) was added. A faint green color was evident immediately which changed to a dark blue-green in a few hours. After stirring for 24 hours, the color of the solution became deep-blue. Any suspended particles were allowed to settle to the bottom. The supernatant dark blue solution was employed as a catalyst; hereinafter referred to as Catalyst B.

(C) Hexamethylphosphoramide (20 ml.) was placed in a 100 ml. round bottom flask under a nitrogen atmosphere. Barium metal, freshly rasped under nitrogen (0.7 grams, 0.0051 mole) was added under a nitrogen atmosphere to the hexamethylphosphoramide. Trans-stilbene (0.92 gram, 0.0051 mole) was added to the mixture of HMP and barium with stirring which was continued at room temperature for 16 hours at which time the reaction mixture became dark purple. The suspension of the barium-stilbene compound was employed as a catalyst, hereinafter referred to as Catalyst C. A portion of this Catalyst C suspension was treated with solid dry carbon dioxide and subsequently acidified to yield stilbene 1,2-dicarboxylic acid, melting point 224° C.

Calculated: Carbon, 71.2%, hydrogen, 5.19%. Found: Carbon, 70.6%; hydrogen, 5.2%.

(D) Barium (7.4 grams) was freshly rasped in a stream of dry nitrogen and added to a 300 ml. round-bottom flask which was fitted wth a fritted glass disc filter, a side arm with two ampules containing 3 grams each of previously dried 1,1-diphenylethylene, and a manifold containing six one-half inch by eight inch pyrex tubes with breakable seals. This apparatus was attached to a vacuum line and pumped overnight. The surface of the apparatus was flamed with a hand torch until sodium emission (D-line) was visible.

The apparatus described was then reflamed and pumped to $10^{-5}$ millimeters Hg pressure and approximately 60 ml. of dried gas-free tetrahydrofuran was flash-distilled into the flask. The tetrahydrofuran in the flask was then frozen with liquid nitrogen and the apparatus sealed off with a hand torch. The tetrahydrofuran was then allowed to rise to room temperature when the flask and apparatus were placed on a magnetic stirrer and stirring was started. The ampules containing the 1,1-diphenylethylene were broken and allowed to co-mix with the tetrahydrofuran and barium metal. There was immediately evident a reaction to produce a highly colored dark-red solution. The reaction mixture was allowed to stir for approximately 18 hours. The resultant solution was filtered, divided into ampules, and sealed off for storage. This solution was employed as a catalyst in the following examples. This catalyst is hereinafter referred to as Catalyst D.

The following examples serve to further illustrate this invention. All parts are by weight, unless otherwise specifically set forth.

EXAMPLE 1

A series of tests following the same procedure for each of the different cyclic siloxanes was followed for this example. The procedure was as follows:

The cyclosiloxane was placed in a 25 ml. round-bottom flask, sealed with a serum stopper, degassed twice and pressured with nitrogen. Then, five drops of Catalyst A was added and the mixture was heated to melt with the cyclic siloxane and mixed thoroughly. In all cases the color of the catalyst went from red to green to colorless as the reaction proceeded. The polymer was recovered by the addition of benzene, containing a trace of glacial acetic acid which dissolved the polymer. The polymer was subsequently precipitated from the benzene solution by pouring the benzene solution into methanol (a large excess). The polymer was then dried in a vacuum oven at 60° C. for 18 hours or until a constant weight was obtained. The results of the series of tests was given in the following table.

N₂-bypass, and a serum-stopped tube. Hexamethylphosphoramide (20 ml.) and cyclooctatetraene (2.5 ml.) were

TABLE I

| Cyclosiloxane | Reaction Temp., °C. | Time | Reaction Media | Yield, percent | Intrinsic Viscosity, dl./gram |
|---|---|---|---|---|---|
| Cis-2,4,6-trimethyl-2,4,6-triphenylcyclotrisiloxane | 30–100 | 5 min | Melt | 90 | 1.5 (benzene, 25° C.). |
| Trans-2,4,6-trimethyl-2,4,6-triphenylcyclotrisiloxane | 30 | 18 hrs | do | 80 | Do. |
| 2,4,6,8-tetramethyl-2,4,6,8-tetrakis-β-cyanoethylcylotetrasiloxane | 30–100 | ~5 min | do | 90 | .5 (MEK, 25° C.). |
| Hexamethylcyclotrisiloxane plus tetramethyltetra-β-cyanoethylcyclotetrasiloxane. | 65 | 1 hr | do | 75 | .6 (MEK, 25° C.). |

MEK = methyl ethyl ketone.

EXAMPLE 2

The same procedure for the polymerization of the cyclic siloxane was employed as that given in Example 1. In this series of polymerizations, Catalyst B was employed as the catalyst. The results of the polymerization employing Catalyst B are given in Table II.

added, mixed and stirred continuously with the amalgam at room temperature. The color of the reaction mixture became red immediately and green after 18 hours. The solution of the calcium cyclooctatetraenyl compound in HMP was used to initiate the polymerization of cis-2,4,6-trimethyl-2,4,6-triphenyl cyclotrisiloxane by coreacting 5

TABLE II

| Cyclosiloxane | Reaction Temp., °C. | Time | Reaction Media | Yield, percent | Intrinsic Viscosity, dl./gram |
|---|---|---|---|---|---|
| Trans-2,4,6-trimethyl-2,4,6-triphenylcyclotrisiloxane | 90 | 50 min | Melt | 90 | 1.0 (benzene, 25° C.). |
| Copolymerization: | | | | | |
| Cis-2,4,6-trimethyl-2,4,6-triphenylcyclotrisiloxane plus 2,4,6,8-tetramethyl-2,4,6,8-tetrakis-β-cyanoethylcyclotetrasiloxane. | 125 | 20 hrs | do | 90 | .6 (MEK, 25° C.). |
| Trans-2,4,6-trimethyl-2,4,6-triphenylcyclotrisiloxane plus 2,4,6,8-tetramethyl-2,4,6,8-tetrakis-β-cyanoethylcyclotetrasiloxane. | 125 | 15 min | do | 90 | .8 (MEK). |

EXAMPLE 3

A series of polymerization of diorganocyclosiloxanes was made employing Catalyst C as the catalyst. The procedure followed was the same as that given in Example 1. Table III gives the results of the series of polymerizations employing Catalyst C.

drops of the solution (10⁻⁵ mole) with 0.5 gram of the cyclotrisiloxane at 100° C. for 15 minutes and at room temperature (27° C.) for 16 hours. The polymer was recovered by dissolving in benzene/acetic acid and subsequent precipitation in methanol. Yield of dry, non-flowing methylphenyl polysiloxane was 90 percent of theory.

TABLE III

| Cyclosiloxane | Reaction Temp., °C. | Time | Reaction Media | Yield, percent | Intrinsic Viscosity, dl./gram |
|---|---|---|---|---|---|
| Cis-2,4,6-trimethyl-2,4,6-triphenylcyclotrisiloxane | 30–100 | 15 min | Melt | 95 | 1.2 (benzene, 25° C.). |
| Trans-2,4,6-trimethyl-2,4,6-triphenylcyclotrisiloxane | 30–100 | 15 min | do | 90 | 1.0 (benzene, 25° C.). |
| Hexamethylcyclotrisiloxane | 100 | 3 hrs | do | 85 | Do. |

EXAMPLE 4

Catalyst D was employed as the catalyst for the polymerization of a series of cyclic diorganosiloxanes. The procedure was as follows:

An apparatus was assembled which contained a 100 ml. round-bottom flask, an ampule containing 1½ ml. of Catalyst D, a breakable seal and a portion of the cyclo diorganosiloxanes attached to a calcium hydride drying column. The apparatus was vacuum-degassed and flamed. The cyclic diorganosiloxane was then melted and allowed to trickle through the calcium hydride column to the 100 ml. flask. The reaction flask was sealed off and the catalyst transferred to the reaction flask. The flask and contents were placed in a 75° C. oven for 24 hours. The reaction was terminated and the polymer recovered by dissolving the polymer in benzene which contained a small amount of glacial acetic acid. The benzene solution was then poured into a large excess of methanol to precipitate the polymer. The polymer was then dried in a vacuum oven at 60° C. for approximately 15 hours. The results of this series of tests is given in Table IV.

Intrinsic viscosity of this polymer was 1.21 deciliters/gram in benzene solution at 25° C.

EXAMPLE 6

Strontium (0.78 gram) was dispersed in 20 ml. dry degassed HMP containing 2.96 grams tetraphenylethylene in a 50 ml. 3-neck round-bottom flask fitted with reflux condenser, N₂-bypass, magnetic stirring bar, and tube with serum closure. The mixture was heated with stirring to 90° C. The reaction mixture became dark purple in color and was allowed to react for 60 hours at 90° C. Five drops (2×10⁻⁶ mole) of the resulting catalyst solution was added to one gram of cis-2,4,6-trimethyl-2,4,6-triphenyl cyclotrisiloxane and mixed in by melting the cyclotrisiloxane (100° C. to 125° C.). Polymerization proceeded rapidly to give an immobile, highly viscous mixture. The polymethylphenylsiloxane was recovered by dissolution in benzene/acetic acid (2%), precipitation in methanol, and drying in vacuo. Yield was 0.95 gram of dry methylphenylpolysiloxane with intrinsic viscosity=2.2 dl./gram (benzene, 25° C.).

TABLE IV

| Cyclosiloxane | Reaction Temp., °C. | Time | Reaction Media | Yield, percent | Intrinsic Viscosity, dl./gram |
|---|---|---|---|---|---|
| Trans-2,4,6-trimethyl-2,4,6-triphenylcyclotrisiloxane | 100 | 24 hrs | Melt | 70 | 1.37 (toluene, 25° C.). |
| Tricyclopentamethylenecyclotrisiloxane | 150 | 24 hrs | do | 80 | 1.67 (benzene, 25° C.). |
| Copolymers: | | | | | |
| Trans-2,4,6-trimethyl-2,4,6-triphenylcyclotrisiloxane plus hexaphenylcyclotrisiloxane. | 200 | 5 hrs | do | 85 | 2.5 (benzene, 25° C.). |

EXAMPLE 5

Calcium (0.4 gram) and 1 ml. Hg were placed in a 150 ml. two-neck round bottom flask which was first evacuated and then heated in order to effect amalgamation. The vacuum was broken under a nitrogen atmosphere and the reaction flask was fitted with condenser,

EXAMPLE 7

Meta-terphenyl (11.4 grams, recrystallized from ethanol) was dissolved in dry, freshly distilled HMP (50 ml.) and treated with a few lumps of calcium hydride in order to remove traces of ethanol. The solution was filtered away from the calcium hydride and added to 1.3 grams magnesium metal amalgamated with 5 ml. Hg. The solution was stirred and heated under a nitrogen blanket. The resulting solution of the magnesium derivative of m-terphenyl was filtered and used as catalyst for the polymerization of cis-2,4,6-trimethyl-2,4,6-triphenyl-cyclotrisiloxane by mixing 10 drops of the solution ($10^{-5}$ mole $Mg^{++}$) with 0.5 gram of the cyclotrisiloxane and heating to 110° C. for one hour. Polymerization proceeded to give an 80% yield of high molecular weight polymethylphenylsiloxane.

EXAMPLE 8

Finely ground barium (0.7 gram, 0.005 mole) was added under a nitrogen atmosphere to 14 ml. HMP in a 100 ml. 2-neck round bottom flask fitted with a glass-covered magnetic stirring bar, condenser, $N_2$ by-pass and 3″ tube with serum closure. The suspension was stirred at room temperature for about 24 hours. No color or other indication of solvated metal was evident. Then, 0.53 ml. cyclooctatetraene was added. A faint green color was immediately obvious. This faint green color had become intensely purple by the end of 1½ hours reaction time. The reaction was filtered and the resulting purple solution was stored in the dark at room temperature. An aliquot of this material was placed in a suitable sample tube and found to be diamagnetic by electron spin resonance spectroscopy, which is consistent with a structure of a barium cation associated with a cyclooctatetraenyl dianion. Addition of n-hexane allowed separation of deep blue crystals which had a neutralization equivalence for the following structure:

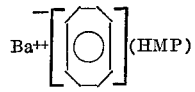

cis-2,4,6-trimethyl-2,4,6-triphenyl cyclotrisiloxane was melted at 130° C. and reacted with $10^{-5}$ moles of the blue crystals. A rapid polymerization ensued on the surface of the crystals to yield a 90% conversion to high molecular weight (methylphenylpolysiloxane) which contained over 60% of its units as isotactic configurations.

The blue crystals were also soluble in tetrahydrofuran. Polymerization of methylphenylcyclosiloxanes, dimethylcyclosiloxanes, and diphenyl cyclosiloxanes was effected employing the tetrahydrofuran solution of the blue crystals.

What is claimed is:

1. A process for the production of essentially linear polydiorganosiloxanes which comprises (1) forming a mixture of (A) at least one cyclic organosiloxane of the formula,

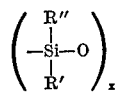

where R′ and R″ are members selected from the class consisting of hydrogen, monovalent hydrocarbon radicals, halogenated monovalent hydrocarbon radicals and cyanoalkyl radicals, and $x$ is an integer equal to from 3 to 7 inclusive, and (B) an organometallic compound of the formula

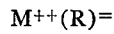

or

where M is a Group II-A metal selected from the class consisting of beryllium, magnesium, calcium, strontium and barium and R is a divalent hydrocarbon radical selected from the class consisting of polynuclear hydrocarcons containing two or more aromatic or heterocyclic pseudo aromatic rings in direct conjugation or fusion in having low energy orbitals capable of electron acceptance, and conjugated hydrocarbons containing double bonded carbons that conjugate with other double-bonded carbon atoms either aliphatic or aromatic in character, said organometallic compound being complexed with an aprotic solvent, and (2) maintaining said mixture at a temperature at which (A) reacts with (B) to produce said essentially linear polydiorganosiloxanes.

2. A process as in claim 1 wherein said aprotic dipolar solvent is hexamethylphosphoramide.

3. The process as in claim 1 wherein an aprotic solvent different from the complexing solvent is employed in amounts, by weight, of from 10 to 1000 parts per 100 parts of the cyclic organosiloxane.

4. A process as in claim 1 wherein the R′ and R″ groups are methyl, ethyl, phenyl, cyanoethyl, cyanopropyl or cyanobutyl groups.

5. A process as in claim 1 wherein the organometallic compound is barium-1,1-diphenylethylene complexed with tetrahydrofuran.

6. A process as in claim 1 wherein the organometallic compound is barium-trans-stilbene complexed with hexamethylphosphoramide.

7. A process as in claim 1 wherein the organometallic compound is barium-1,1-diphenylethylene complexed with hexamethylphosphoramide.

8. A process as in claim 1 wherein M is calcium and R is cyclo-octatetraene and the complexing agent is hexamethylphosphoramide.

9. A process as in claim 1 wherein M is strontium, R is tetraphenylethylene and the organometallic compound is complexed with hexamethylphosphoramide.

10. A process as in claim 1 wherein M is magnesium and R is meta-terphenyl.

11. A process as in claim 1 wherein said aprotic dipolar solvent is tetrahydrofuran.

References Cited

UNITED STATES PATENTS

| | | | |
|---|---|---|---|
| 3,274,154 | 9/1966 | Kendrick et al. | 260—46.5 |
| 3,294,740 | 12/1966 | McVannel | 260—46.5 |
| 3,351,646 | 11/1967 | Ramsden | 260—429.7 |
| 3,354,190 | 11/1967 | Ramsden | 260—429.7 |

DONALD E. CZAJA, Primary Examiner

M. I. MARQUIS, Assistant Examiner

U.S. Cl. X.R.

177—161; 252—63.7; 260—37, 448.2, 665